US011256675B2

(12) United States Patent
Velur et al.

(10) Patent No.: US 11,256,675 B2
(45) Date of Patent: Feb. 22, 2022

(54) METHOD AND SYSTEM FOR CREATING RAPID SEARCHABLE ALTERED DATA IN A DATABASE

(71) Applicant: Visa International Service Association, San Francisco, CA (US)

(72) Inventors: Shashi Velur, Austin, TX (US); Mohammad Al-Bedaiwi, Round Rock, TX (US); Nagaveera Venkata Su Tavvala, Cedar Park, TX (US); Jonathan Twichell, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 69 days.

(21) Appl. No.: 16/798,092

(22) Filed: Feb. 21, 2020

(65) Prior Publication Data

US 2020/0272612 A1 Aug. 27, 2020

Related U.S. Application Data

(60) Provisional application No. 62/809,046, filed on Feb. 22, 2019.

(51) Int. Cl.
*G06F 17/00* (2019.01)
*G06F 16/22* (2019.01)
*G06F 16/2458* (2019.01)
*G06F 16/2457* (2019.01)
*G06F 16/248* (2019.01)

(52) U.S. Cl.
CPC ........ *G06F 16/2255* (2019.01); *G06F 16/248* (2019.01); *G06F 16/2458* (2019.01); *G06F 16/24575* (2019.01)

(58) Field of Classification Search
CPC ............ G06F 16/2255; G06F 16/2458; G06F 16/24575; G06F 16/248; G06F 21/6227; G06F 21/6245
See application file for complete search history.

(56) References Cited

U.S. PATENT DOCUMENTS

| 9,129,118 | B1 * | 9/2015 | Johansson | ........... G06F 21/6227 |
| 2004/0236761 | A1 | 11/2004 | Both | |
| 2016/0232362 | A1 | 8/2016 | Conway | |
| 2017/0337549 | A1 * | 11/2017 | Wong | .................. G06F 21/6254 |

FOREIGN PATENT DOCUMENTS

EP 1442580 8/2004

OTHER PUBLICATIONS

EP20158758.1 , "Extended European Search Report", Jun. 25, 2020, 8 pages.

* cited by examiner

*Primary Examiner* — Greta L Robinson
(74) *Attorney, Agent, or Firm* — Kilpatrick Townsend & Stockton LLP

(57) ABSTRACT

A method comprises receiving, by a server computer, a request message comprising at least a credential from a client device. The server computer can hash the credential to form an altered value. The server computer can then determine whether or not the altered value matches one of the hashed values stored in the database. If the altered value matches a matched hashed value, the server computer can determine a range of a plurality of ranges. The range can be associated with the matched hashed value. The server computer can then determine a data item associated with the range. The server computer can provide the data item to the client device.

19 Claims, 6 Drawing Sheets

METHOD AND SYSTEM FOR CREATING RAPID SEARCHABLE ALTERED DATA IN A DATABASE

CROSS-REFERENCE TO RELATED APPLICATIONS

This application claims the benefit of U.S. Provisional Application No. 62/809,046, filed Feb. 22, 2019, which is herein incorporated by reference in its entirety for all purposes.

BACKGROUND

It can be preferable to store altered data rather than plaintext data in a database due to security restrictions. Storing plaintext data in a database is problematic for a number of reasons. For example, plaintext data is susceptible to being obtained by a malicious party should the database be breached. Rather than storing plaintext data, a database can store altered data.

However, searching for altered data in a database is a computationally heavy and time consuming task. Currently, a computer can search through every stored instance of altered data to determine a particular instance of altered data. For example, a computer can determine if an altered value is in a database by comparing a known altered value to each and every stored altered value to determine if there is a match. In other situations, the computer can store cryptographically encrypted data. However, each and every stored encrypted value needs to be decrypted in order to find a particular value. Time sensitive tasks can be substantially delayed by storing and searching through altered data.

Embodiments of the disclosure address this problem and other problems individually and collectively.

SUMMARY

Some embodiments are related to methods and systems for creating rapid searchable altered data in a database. Other embodiments are related to methods and systems for searching a database for a data item associated with an altered value.

One embodiment is related to a method comprising: receiving, by a server computer, a request message comprising at least a credential from a client device; hashing, by the server computer, the credential to form an altered value; determining, by the server computer, whether or not the altered value matches one of a number of hashed values stored in a database; if the altered value matches a matched hashed value, determining, by the server computer, a range of a plurality of ranges, the range being associated with the matched hashed value; and determining, by the server computer, a data item associated with the range.

Another embodiment is related to a server computer comprising: a processor and a computer-readable medium coupled to the processor. The computer-readable medium can comprise code executable by the processor for implementing the method above.

Another embodiment is related to a method comprising: providing, by a client device, a request message comprising at least a credential to a server computer, wherein the server computer hashes the credential to form an altered value, determines whether or not the altered value matches one of a number of hashed values stored in a database, if the altered value matches a matched hashed value, determines a range of a plurality of ranges, the range being associated with the matched hashed value, determines a data item associated with the range, and provides the data item to the client device; and receiving, by the client device, the data item from the server computer.

Further details regarding embodiments of the disclosure can be found in the Detailed Description and the Figures.

DETAILED DESCRIPTION

Figure 1:
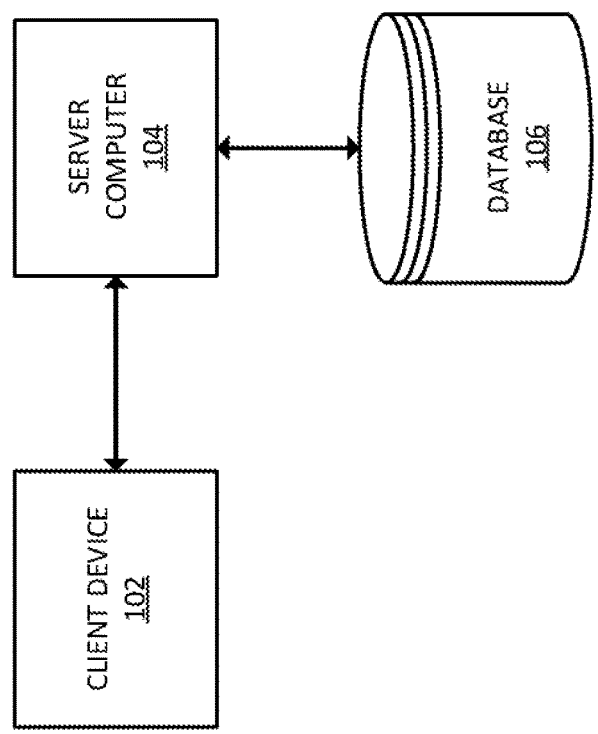
FIG. 1 shows a block diagram illustrating a system according to embodiments.

Prior to discussing embodiments of the disclosure, some terms can be described in further detail.

A "client device" can include device configured to communicate with a server computer. The client device may be located remotely in reference to the server computer. A client device can include a resource provider computer, a transport computer, a personal digital assistant (PDA), a laptop computer, a desktop computer, a server computer, a tablet PC, etc. In some embodiments, a client device may be a user device.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

A "user" may include an individual. In some embodiments, a user may be associated with one or more personal accounts and/or mobile devices. The user may also be referred to as a cardholder, account holder, or consumer in some embodiments.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

An "altered value" can include a value which has been changed in structure or composition. An altered value may be changed from an initial state to a final state. In some embodiments, an altered value may be a hashed value.

A "hashed value" can include a value which has been altered by a hash function. In some embodiments, a hash function can include a function that can be used to map data of arbitrary size to fixed-size values. The values output (e.g., returned) by a hash function can be hashed values. A hashed value can be determined using a suitable hash function (e.g., HMAC SHA256, SHA384, SHA512, MD5, MD6, etc.).

A "data item" can include a unit of data. In some embodiments, a data item can comprise attributes, plans, and/or indicated methods. In some embodiments, a data item can include data identifying a particular encryption process. In other embodiments, a data item can include data identifying a routing table that can determine to which computers a request message can be forwarded based on received value (e.g., a credential) associated with the data item. In some embodiments, a data item may include data identifying an installment plan. The installment plan can include a plurality of attributes, for example, a plan type (e.g., promo, regional, etc.), a tenure (e.g., 1 month, 2 years, etc.), a tenure type (e.g., weekly, monthly, yearly, etc.), an effective date range, an account BIN (bank identification number), a range, a credential, an acceptor identifier, a transport computer BIN, a MID (merchant identifier), a SKU (stockkeeping unit), a country code, an MCC (merchant category code), an access device identifier, a currency code, an amount range, a score range (e.g., a credit score range, etc.), and/or any other suitable attribute capable of conveying information regarding the installment plan. In yet other embodiments, a data item can include data identifying a communication channel on which subsequent communications may occur.

A "shortened plaintext value" can include a plaintext value shortened from a larger plaintext value. In some embodiments, a shortened plaintext value can include a value which represents a first predetermined number of digits of a larger value. For example, a value of 1234567890123456 can correspond to a shortened plaintext value of 123456789, where the shortened plaintext value represents the first 9 digits of the larger value. In some embodiments, a server computer can truncate a value (e.g., a credential) and compare the truncated value to a shortened plaintext value to determine whether or not the values match.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values. Transaction data can include, for example, any suitable information related to a transaction between two entities. Transaction data may include information related to a completed transaction or a transaction that has not yet been completed. In some embodiments, transaction information may include any suitable information related to a context of a transaction. For example, transaction data may include a time at which the transaction was conducted, a terminal at which the transaction was conducted, an amount for which the transaction was conducted, an indication of an entity with whom the transaction was conducted, or any other suitable transaction-related information.

A "resource provider" may be an entity that can provide a resource such as goods, services, information, and/or access. Examples of resource providers includes merchants, data providers, transit agencies, governmental entities, venue and dwelling operators, etc.

The term "verification" and its derivatives can include to a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Introduction

Embodiments of the disclosure allow for a method and system for creating rapid searchable altered data in a database. Embodiments may utilize a first altered data embodiment, a second altered data embodiment, or a combination therefrom (e.g., a hybrid method, also referred to as a third altered data embodiment) to search a database for an altered value. In some embodiments, a server computer can determine if a received credential is included in a hashed range stored in a database.

In some embodiments, a server computer, such as a processing network computer, can receive a request message from a client device (e.g., a transport computer, a user device, etc.). The request message may comprise at least a credential. The credential can be associated with a user and/or a user device. The server computer can then hash the credential to form an altered value. For example, the server computer can hash the credential with a hash function. After forming the altered value, the server computer can determine whether or not the altered value matches one of the hashed values stored in the database.

For example, in some embodiments according to a first altered data embodiment, the server computer can search through each stored hashed value in the database until a match is found with the altered value formed from the credential. In other embodiments according to a second altered data search embodiment, the server computer can match a first predetermined number of digits of the credential (e.g., 5, 8, 9 digits, etc.), in plaintext, to a plurality of stored shortened plaintext values. The server computer can then hash a second predetermined number of digits (e.g., the first predetermined number of digits plus one) to stored hashed values associated with the matched shortened plaintext value. The server computer can continue to hash an increasing number of digits of the credential to compare to hashed values stored in the database. The server computer can then compare the formed altered value to a plurality of stored hashed values that are stored in association with the previously matched hashed value. In yet other embodiments according to a hybrid search, the server computer can match a first predetermined number of digits of the credential (e.g., 5, 8, 9 digits, etc.), in plaintext, to a plurality of stored shortened plaintext values. The server computer can then compare the formed altered value to a plurality of stored hashed values that are stored in association with the matched shortened plaintext value.

If the altered value matches a matched hashed value, the server computer can determine a range of a plurality of ranges. The plurality of ranges can be stored in the database. The determined range can be associated (e.g., stored in association) with the matched hashed value. The server computer can then determine a data item that is associated with the range. For example, the data item may be stored in association with the range. After determining the data item, the server computer can provide the data item to the client device.

II. Systems

According to embodiments, a server computer can initialize a database of altered data in an efficient manner. After initialization, the server computer can rapidly search the database for an altered value based on data received from a client device. Systems described herein can be configured to both 1) create databases comprising altered values and 2) search the database for a particular altered value. In some embodiments, the stored altered values can be associated with a range that is further associated with a data item. Embodiments allow for a server computer to determine a data item based on a selected altered value, the selected altered value being matched to a received credential from a client device, for example.

A. System Overview

FIG. 1 shows a block diagram of a system 100 according to embodiments of the disclosure. The system 100 comprises a client device 102, a server computer 104, and a database 106. The server computer 104 may be in operative communication with the database 106. In some embodiments, the server computer 104 may be operatively coupled to the database 106.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the client device 102, the server computer 104, and/or the database 106 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The client device 102 can include a computer which can access a service made available by a server, such as the server computer 104. In some embodiments, the client device 102 can be configured to transmit a request message to the server computer 104. The request message can comprise credentials associated with a user, a user device, etc. In some embodiments, the request message may be an authorization request message.

The server computer 104 can include any suitable computer capable of performing methods described herein. The server computer 104 can be a computer configured to initialize a database comprising altered data that can be rapidly searched. The server computer 140 can be further configured to rapidly search the database for an altered value.

For example, in some embodiments, the server computer 104 can be configured to receive the request message comprising at least a credential from the client device 102. The server computer 104 can be further configured to hash the credential to form an altered value. The server computer 104 can be configured to determine whether or not the altered value matches one of the hashed values stored in the database. If the altered value matches a matched hashed value, the server computer 104 can determine a range of a plurality of ranges. The range can be associated with the matched hashed value. The server computer 104 can be further configured to determine a data item associated with the range, and provide the data item to the client device 102.

In some embodiments, the server computer 104 can be a network processing computer (e.g., a network processing computer 810 as depicted in FIG. 8). In some embodiments, a network processing computer may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa integrated Payments system) which processes authorization requests and a Base II system which performs clearing and settlement services.

The database 106 can include any suitable database. The database may be a conventional, fault tolerant, relational, scalable, secure database such as those commercially available from Oracle™ or Sybase™.

B. Server Computer

Figure 2:
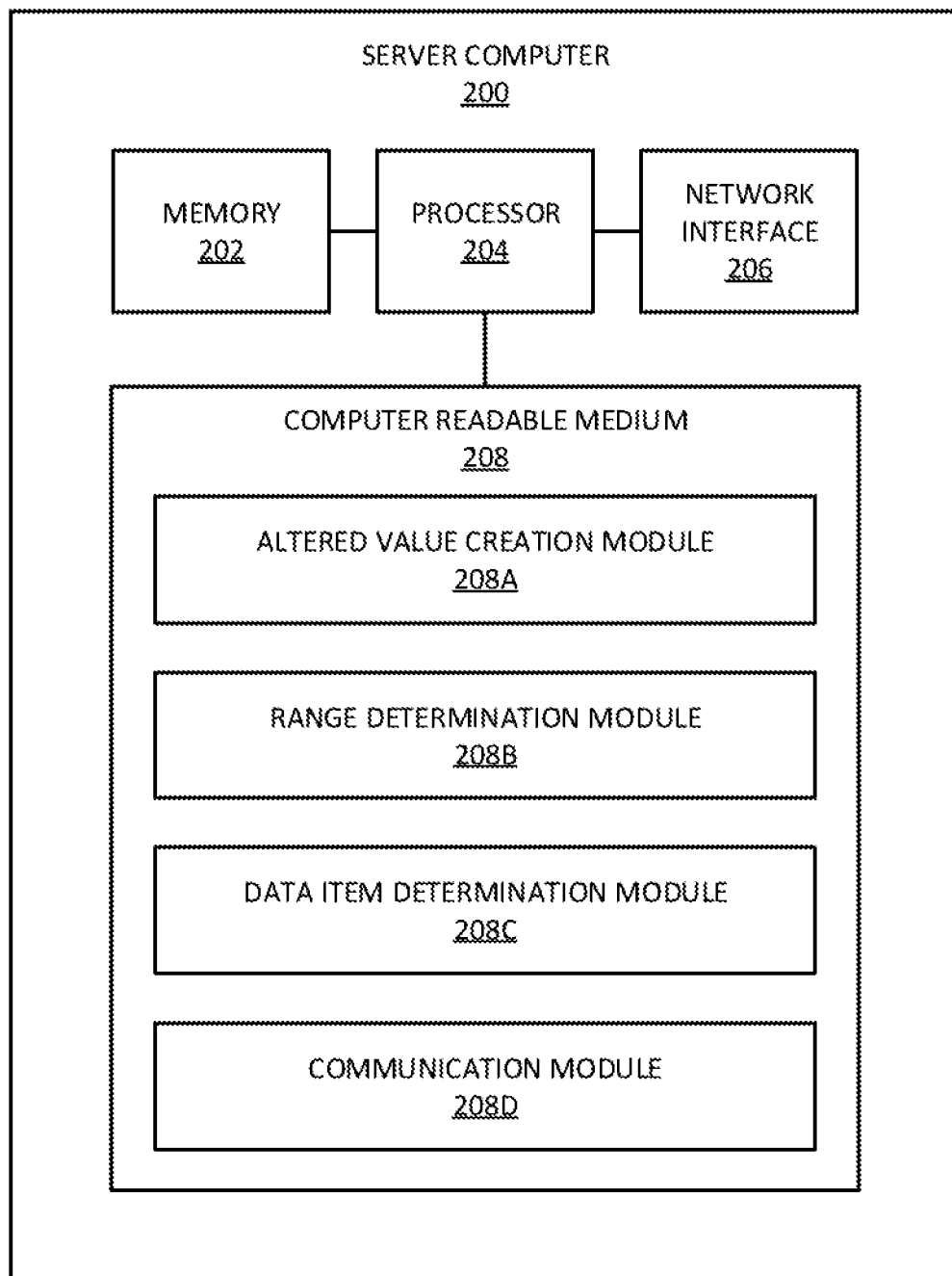
FIG. 2 shows a block diagram of a server computer according to embodiments.

FIG. 2 shows a block diagram of a server computer 200 according to embodiments. The exemplary server computer 200 may comprise a processor 204. The processor 204 may be coupled to a memory 202, a network interface 206, input elements 210, output elements 212, and a computer readable medium 208. The computer readable medium 208 can comprise an altered value creation module 208A, a range determination module 208B, a data item determination module 208C, and a communication module 208D. In some embodiments, the server computer 200 may be in operative communication with the database 106. In some embodiments, the server computer 200 can be a network processing computer.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store credentials, altered values, hashed values, ranges, data items, and/or any other suitable data described herein.

The computer readable medium 208 may comprise code, executable by the processor 204, for performing the following method comprising: receiving, by a server computer, a request message comprising at least a credential from a client device; hashing, by the server computer, the credential to form an altered value; determining, by the server computer, whether or not the altered value matches one of a number of hashed values stored in a database; if the altered value matches a matched hashed value, determining, by the server computer, a range of a plurality of ranges, the range being associated with the matched hashed value; and determining, by the server computer, a data item associated with the range.

The altered value creation module 208A may comprise code or software, executable by the processor 204, for creating altered value(s). The altered value creation module 208A, in conjunction with the processor 204, can create an altered value (e.g., a hashed value) using a hash function. In some embodiments, the altered value creation module 208A, in conjunction with the processor 204, can hash a credential, received from a client device, to form an altered value.

The hash function may be performed using various techniques including, for example, hash tables, a trivial hash function, perfect hashing, minimal perfect hashing, hashing uniformly distributed data or other distributions, rolling hash, universal hashing, multiplicative hashing, and/or cryptographic hash functions. The hash function may convert a value (e.g., credentials) to a fixed-sized hash. The hash function can behave as a random function (popularly known as Random Oracle Model) and can be instantiated with a cryptographic hash function. An example hashing function may include SHA-256.

After the altered value creation module 208A, in conjunction with the processor 204, creates the altered value, the server computer 200 can determine whether or not the altered value matches a hashed value stored in the database. The hashed value that matches the determined altered value can be referred to as a matched hashed value. The server computer 200 can search the database for a stored altered value that matches the determined altered value as described in further detail below. For example, the server computer 200 can search the database using a first altered data embodiment, a second altered data search embodiment or a hybrid search.

The range determination module 208B can include may comprise code or software, executable by the processor 204, for determining range(s). The range determination module 208B, in conjunction with the processor 204, can determine a range of a plurality of ranges stored in the database. The range can be associated with the matched hashed value. For example, each hashed value stored in the database can be associated (e.g., stored in association with) a range of the plurality of ranges. In some embodiments, a stored hashed value can be associated with one or more ranges. For example, a given credential (e.g., 200) may lie within two overlapping ranges (e.g., 100-300 and 150-800).

The data item determination module 208C can include may comprise code or software, executable by the processor 204, for determining data item(s). The data item determination module 208C, in conjunction with the processor 204, can determine a data item of a plurality of data items stored in the database. For example, a range, which was determined by the range determination module 208B, can be stored in relation to a data item. In some embodiments, each range of the plurality of ranges stored in the database can be associated with a data item of the plurality of data items. A data item can include any suitable unit of data. For example, in some embodiments, a data item may include an installment plan. The installment plan can include a plurality of attributes, for example, a plan type (e.g., promo, regional, etc.), a tenure (e.g., 1 month, 2 years, etc.), a tenure type (e.g., weekly, monthly, yearly, etc.), an effective date range, an account BIN, a range, a credential, an acceptor identifier, a transport computer BIN, a MID, a SKU, a country code, an MCC, an access device identifier, a currency code, an amount range, a score range (e.g., a credit score range, etc.), and/or any other suitable attribute capable of conveying information regarding the installment plan.

Table 1 below illustrates an example data item that is an installment plan. A different installment plan can be associated with each of the ranges.

TABLE 1

Example Data Item Attributes

| Attribute Name | Single or Multiple | Data Type | Range or List of Single | Encrypted | Valid Enum Values |
|---|---|---|---|---|---|
| Authorizing Entity Attributes | | | | | |
| Plan Type | Single | Integer | Single | No | Promo, Regional, etc. |
| Tenure | Single | Integer | Single | No | |
| Tenure Type | Single | Enum | Single | No | Weekly, Monthly, Yearly |
| Effective Date Range | Multiple | Range of Date | Range | No | |
| Account BIN | Multiple | Integer (6-8 digits) | Range | No | |
| Account Range | Multiple | Integer (6-16) | Range | Yes | |
| PAN | Single | Integer (16-digit?) | Single | Yes | |
| Resource Provider Attributes | | | | | |
| Acceptor Id | Multiple | String | List | No | |
| Acquirer BIN | Multiple | String | List | No | |
| MID | Multiple | String | List | No | |
| SKU | Multiple | String | List | No | |
| Global Attributes | | | | | |
| Country Code | Multiple | String | List | No | Country in ISO 3166-1 alpha-2 format, eg "US" |
| MCC | Multiple | String | List | No | Merchant Category Codes |
| Interaction Attributes | | | | | |
| Access Device ID | Multiple | String | List | No | |
| Interaction Currency Code | Single | String (max length 4) | String | No | E.g., as defined by ISO 4217 format |

TABLE 1-continued

Example Data Item Attributes

| Attribute Name | Single or Multiple | Data Type | Range or List of Single | Encrypted | Valid Enum Values |
|---|---|---|---|---|---|
| Interaction Amount Range | Multiple | String | Range | No | |
| Custom Attributes | | | | | |
| Score Range | Multiple | Integer | Range | No | E.g., credit score range |

In some embodiments, there can be more than one instance of the attributes of Table 1 for the same data item. For example, a data item can have multiple credentials, multiple ranges, multiple date ranges, etc.

The range can be associated with the data item that is stored in the database. The data item can be an installment plan including any suitable criteria. The plan criteria can be, for example, singular values, list of singular values, or a range of values or a list of range of values. In some cases, it may be difficult to represent the installment plan criteria and installment plan fee data in a relational schema; therefore, criteria can be more suitable for a document database (e.g., MongoDB). In some embodiments, each data item can be treated as a document. The structure of a data item can be as shown in Table 2.

TABLE 2

Example Data Item

```
{
    "name":"Plan Name",
    "type":"Plan Type", //PROMO, REGIONAL, ...
    "tenure":"3", //1, 2, 3, 6, 9, 12
    "tenureType":"Tenure Type", //WEEKLY, MONTHLY, YEARLY
    "dateRanges": [{
            "startDate":"11513513513", //UTC of effective start date
            "endDate":"1951957915", //UTC of effective end date
    }],
    "status":"Status", //PENDING, ACTIVE, EXPIRED, INACTIVE
    "amountRanges": [{
            "minAmount":"1000.00",
            "maxAmount":"2000.00"
    },{
            "minAmount":"500.00",
            "maxAmount":"600.00"
    }],
    "amountCurrencyCode":"USD",
    "accountRanges":[{
        "minAccountNumber":"12345678901", //This will be
        encrypted
        "maxAccountNumber":"12345678903" //This will be
        encrypted
    },{
        "minAccountNumber":"12345678911", //This will be
        encrypted
        "maxAccountNumber":"12345678915" //This will be
        encrypted
    },{
        "minAccountNumber":"12345678901234", //This will
        be encrypted
        "maxAccountNumber":"12345678901235" //This will be
        encrypted
    }],
    "mccs":["MCC1","MCC2","MCC3"], //Eligible MCC codes
    for this plan
    "fees":{
            //STRUCTURE HERE
    },
    "termsAndConditions":{
```

TABLE 2-continued

Example Data Item

```
        "5e13573a-251a-11e9-ab14-
        d663bd873d93":http://someExampleURL.net,
        "2e13573a-t21a-11e9-ab14-
        d653bd873d94":http://someExampleURL.com,
    }
}
```

The communication module 208D can include may comprise code or software, executable by the processor 204, for communicating with one or more devices. For examples, the communication module 208D, in conjunction with the processor 204, can provide capabilities for the server computer 200 to communicate with the client device or the database. The communication module 208D may be configured or programmed to perform some or all of the functionality associated with receiving, sending, and generating electronic messages for transmission at the server computer 200. When an electronic message is received by the server computer 200, the electronic message may be passed to the communication module 208D. The communication module 208D may identify and parse the relevant data based on a particular messaging protocol used in the server computer 200. The communication module 208D may then transmit any received information to an appropriate module within the server computer 200. The communication module 208D may also receive information from one or more of the modules in the server computer 200 and generate an electronic message in an appropriate data format in conformance with a transmission protocol used in the server computer 200 so that the message may be sent to one or more entities within system. The electronic message may then be passed to, for example, an external communication interface for transmission.

The network interface 206 may include an interface that can allow the server computer 200 to communicate with external computers. The network interface 206 may enable the server computer 200 to communicate data to and from another device (e.g., a client device, a database, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

III. Methods

Embodiments can use the systems and apparatuses described herein to create rapid searchable altered data in a database. Embodiments can allow a server computer to determine a range associated with a matched hashed value and determine a data item associated with the range. In some embodiments, the data item may then be utilized during, for example, an interaction. In some embodiments, the server computer (not shown) described throughout FIGS. 3-4 and the network processing computer 610 of FIG. 6 may include the server computer 104 or the server computer 200 of FIGS. 1 and 2, respectively.

In some embodiments, the server computer can perform a second altered data embodiment to initialize a database comprising altered data. In other embodiments, the server computer can perform a first altered data embodiment. In yet other embodiments, the server computer can perform a third altered data embodiment, the third altered data embodiment being a hybrid of the second altered data embodiment and the first altered data embodiment.

These methods will be described in reference to ranges of values, where each value can be, for example, a credential. It is understood, however, that the values corresponding to altered values are not limited to being credentials. For example, the altered values can correspond to hashed identifiers, hashed transportation ticket numbers, hashed metadata, etc. The following sections describe multiple ways to search for an altered value specifically, to determine if a given altered value satisfies any of a plurality of hashed ranges. In some embodiments, the ranges can be of various sizes (e.g., 9-digit to 16-digit values).

As an example, consider a 16-digit value (e.g., a 16-digit credential): 1234567890123456. The server computer may determine if this credential satisfies the following ranges (with 8+ digit lower limit and 8+ digit upper limit account ranges): 1) 1234567890000000-1234567890999999, 2) 1234567890123000-1234567890123999, 3) 1234567890123450-123456790123459, 4) etc.

The above account ranges are shown in plaintext for explanation, but can be hashed in practice in the database for security reasons. For example, the first range of 1234567890*-1234567891* may be hashed to J54FSD1-G6A88EM. When the upper and lower limits of the ranges are hashed, it is not possible to do a simple string matching to see if a given credential satisfies any of the above ranges as they are hashed. The hashed lower and upper limits of the ranges may be random strings and cannot be searched.

One brute-force method is to decrypt every encrypted range and then search if the given credential matches a range. However, the values then need to be encrypted rather than hashed. This is further problematic since this can include hundreds/thousands of ranges that are decrypted per search (e.g., during an API call). This is not desirable for a low latency search. Next, database initialization utilizing embodiments will be discussed.

A. Database Initialization—First Altered Data Embodiment

Figure 3:
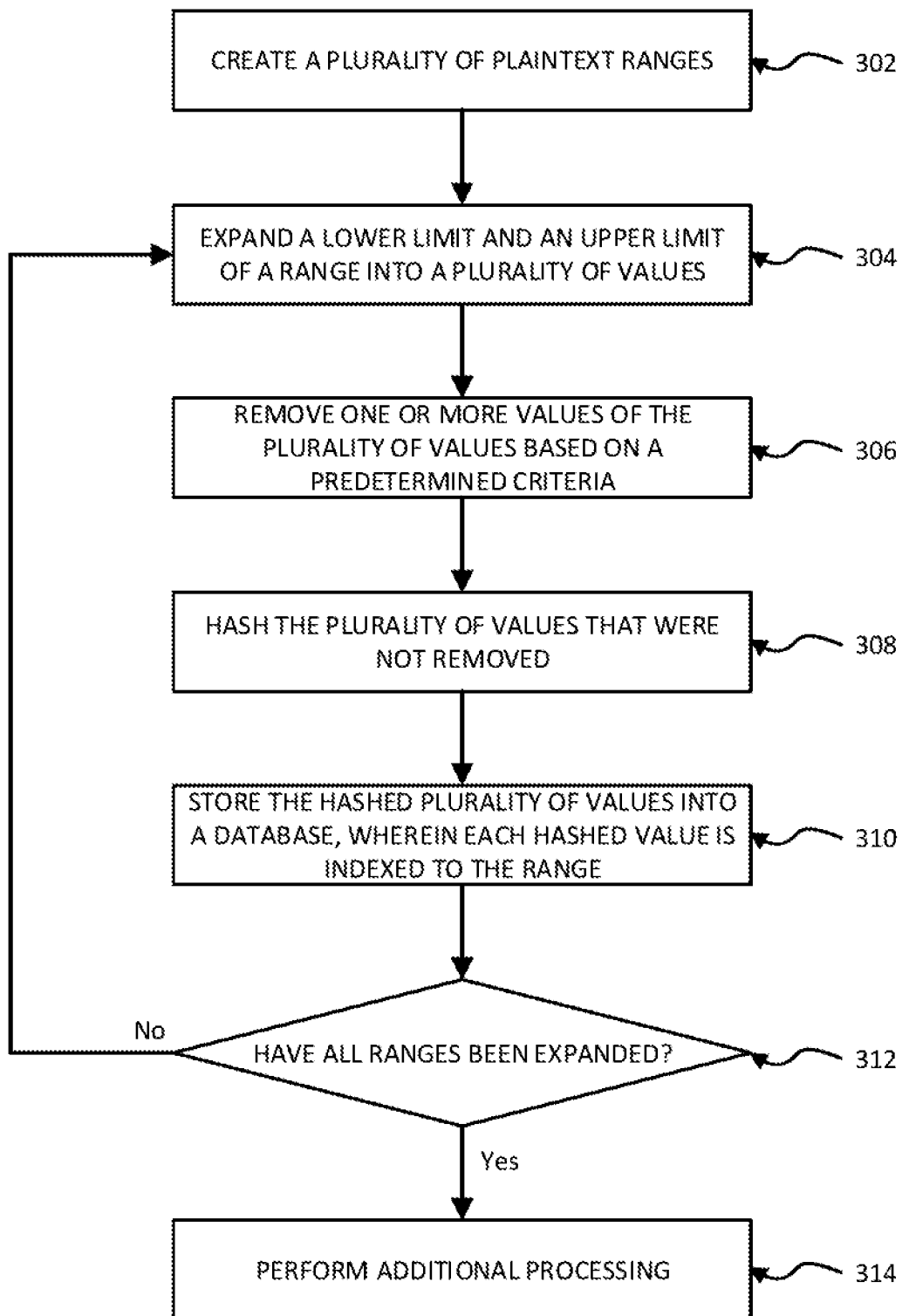
FIG. 3 shows a flow diagram of rapid searchable altered data creation method according to embodiments.
Figure 5:
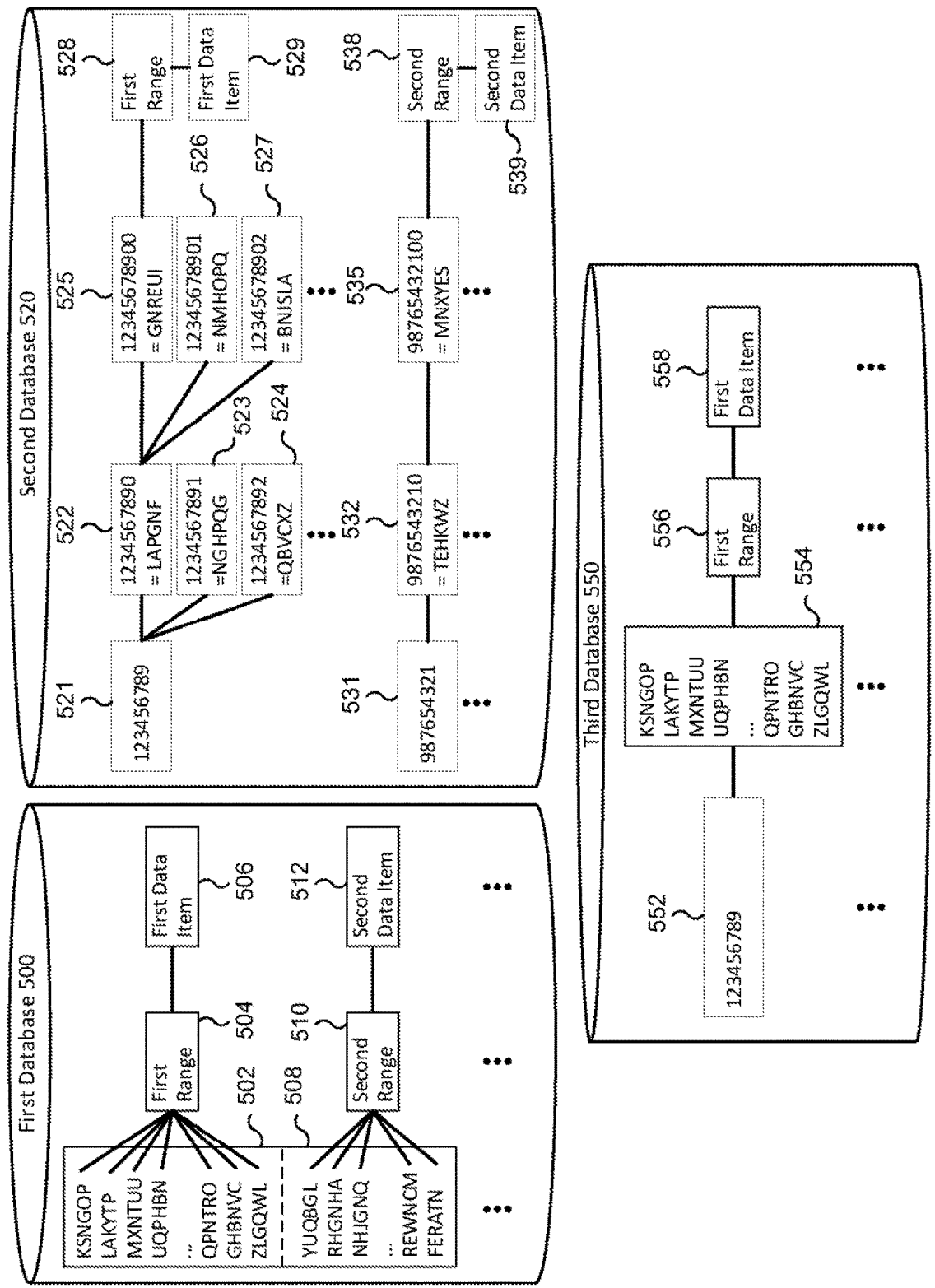
FIG. 5 shows illustrative databases initialized by a server computer according to embodiments.

FIG. 3 shows a flow diagram of rapid searchable altered data creation method according to embodiments. The method illustrated in FIG. 3 will be described in the context of a computer initializing a database comprising altered data such that the data may be rapidly searched according to methods described herein. It is understood, however, that the invention can be applied to other circumstances. Further, FIG. 5 shows illustrative databases according to embodiments. A first database 500 of FIG. 5 illustrates a database initialized with the method of FIG. 3.

The first database 500 can comprise a plurality of hashed expanded ranges. For example, a first hashed expanded range 502 can include hashed values of KSNGOP, LAKYTP, MXNTUU, UQPHBN, QPNTRO, GHBNVC, and ZLGQWL. The first database 500 can also include a second hashed expanded range 508 that includes hashed values of YUQBGL, RHGNHA, NHJGNQ, REWNCM, and FERATN. Each hashed expanded range can be formed from a range as described in FIG. 3. Each hashed expanded range can be associated with a range. For example, the first hashed expanded range 502 can be associated with the first range 504, whereas the second hashed expanded range 508 can be associated with the second range 510. FIG. 5 illustrates that the hashed expanded ranges are directly associated with the ranges. However, it is understood, that in some embodiments, the hashed values can be directly associated with the ranges. For example, the hashed value of KSNGOP can be associated with the first range 504, the hashed value of LAKYTP can be associated with the first range 504, the hashed value of YUQBGL can be associated with the second range 510, etc. Each range may include a hashed upper limit and a hashed lower limit. The first range 504 may be a range of 1234567890123450-1234567890123459. The first range 504 may include a hashed lower limit and a hashed upper limit. For example, the lower limit of 1234567890123450 can be hashed to AAABBB while the upper limit of 1234567890123459 can be hashed to BBBCCC. The first range 504, as stored in the first database 500, can be AAABBB-BBBCCC. Each range stored in the first database 500 can be associated with a data item. For example, the first range 504 can be associated with the first data item 506. The second range 510 can be associated with the second data item 512.

Referring to FIG. 3, a server computer can initialize the first database 500. At step 302, the server computer can create a plurality of ranges. Each range can be a plaintext range and can include plaintext values. In some embodiments, the values of the ranges can be of any suitable length (e.g., 5 digits, 9 digits, 16 digits, 32 digits, etc.). Each range may be associated with a data item including, for example, attributes, plans, and/or methods. The association of a data item and a range may be predetermined, in some embodiments.

As an illustrative example, the server computer can create the first range 504 to be 123456789012345*, where each value in the range is a 16 digit value, and where * can be a wildcard that represents any suitable digits after the wildcard. The use of the wildcard in this example, can indicate that the total range has a lower limit of 1234567890123450 and an upper limit of 1234567890123459. The first range 504 can be associated with a first data item 506. The first data item 506 can be any suitable data item described herein. For example, the first data item 506 can be a first installments plan. In some embodiments, a value can represent a credential (e.g., 1234567890123455) and if the value lies within a particular range, then the credential can be associated with the data item (e.g., the installment plan).

At step 304, the server computer can expand one range of the plurality of ranges. For example, the server computer can expand a lower limit and an upper limit of the first range 504 into a plurality of values. The first range 504 of 1234567890123450-1234567890123459 can be expanded to the following ten values: 1234567890123450, 1234567890123451, 1234567890123452, 1234567890123453, 1234567890123454, 1234567890123455, 1234567890123456, 1234567890123457, 1234567890123458, and 1234567890123459. As an example, of an expanded range, in some embodiments, the expanded range can include each value (e.g., integer) between, and including, a lower limit and an upper limit, while a range may include the lower limit and the upper limit.

At step 306, after expanding the first range 504 of the plurality of ranges, the server computer can remove values in the expanded range that do not satisfy a predetermined criteria. The predetermined criteria can be any suitable criteria. For example, in some embodiments, the predetermined criteria can be even numbers. The server computer can then remove each odd number from the expanded range.

In other embodiments, for example, the predetermined criteria can include the values passing a modulus 10 test. The server computer can remove all values that do not pass a modulus 10 test (e.g., Luhn's algorithm). The modulus 10 test can be a checksum formula which can validate a variety of identification numbers.

For example, in some embodiments, the server computer can verify a number against its included check digit, which can usually be appended to a partial account number to generate a full account number. This number can pass the following modulus 10 test, however, it is understood that the server computer can perform any suitable implementation of a modulus 10 test. In some embodiments, a modulus 10 test can include the following three steps.

1) From the rightmost digit, which can be a check digit, and moving left, double the value of every second digit. The check digit may not be doubled; the first digit doubled can be located immediately to the left of the check digit. If the result of this doubling operation is greater than 9 (e.g., 8×2=16), then add the digits of the result (e.g., 16: 1+6=7, 18: 1+8=9) or, alternatively, the same final result can be found by subtracting 9 from that result (e.g., 16: 16-9=7, 18: 18-9=9).

2) Take the sum of all the digits.

3) If the total modulo 10 is equal to 0 (i.e., if the total ends in zero) then the number is valid according to the modulus 10 test; else it is not valid.

At step 308, after removing values in the range that do not satisfy the predetermined criteria, the server computer can hash each value (i.e., the values that were not removed in step 306). The server computer can hash the values in any suitable manner. For example, the server computer can hash the values with a hash function (e.g., HMAC SHA256, SHA384, SHA512, MD5, MD6, etc.). The hash function can be any suitable hash function and may hash the values any suitable number of times (e.g., 1 time, 2 times, 3 times, etc.).

As an illustrative example, the sever computer can hash the values of the first range 504. The values of the first range 502 include 1234567890123450, 1234567890123451, 1234567890123452, 1234567890123453, . . . , 1234567890123457, 1234567890123458, and 1234567890123459. The server computer can hash the value of 1234567890123450 to obtain a hashed value (e.g., Hash (1234567890123450)=KSNGOP). The server computer can hash each value of the first range 504 to obtain the hashed values included in the hashed expanded range 502 (e.g., KSNGOP, LAKYTP, MXNTUU, UQPHBN, QPNTRO, GHBNVC, and ZLGQWL).

At step 310, the server computer can then store the hashes as well as index the hashes against the range. For example, the server computer can store the hashes of the hashed expanded range 502 in a database in association with the first range 504. The hashes of the values 1234567890123450, 1234567890123451, 1234567890123452, . . . , 1234567890123459, and 1234567890123460 can be indexed against (e.g., stored in association with) the range of 1234567890123450-1234567890123459, however, these values can be hashed in the first database 500 and are shown here in plaintext for illustration.

Furthermore, in some embodiments, the server computer can store a data item in association with the range. For example, the server computer can store the first data item 506 in association with the first range 504.

At step 312, the server computer can determine whether or not all of the ranges of the plurality of plaintext ranges have been expanded as in step 304. If the server computer determines that not all of the ranges have been expanded, then the server computer can repeat steps 304-310 for each not yet expanded range. The server computer can perform steps 304-312 any suitable number of times. If the server computer determines that all of the ranges of the plurality of plaintext ranges have been expanded, then the server computer can proceed to step 314.

For example, the server computer can then expand the lower limit and the upper limit of the second range 510 into a plurality of values. The server computer can remove any suitable values based on a predetermined criteria. In some embodiments, the predetermined criteria can be the same or a different predetermined criteria as was utilized for the first range 504. The server computer can hash the plurality of values that were not removed. For example, the server computer can form the hashes of the hashed expanded range 508. The server computer can store the hashed plurality of values into the first database 500 in association with the second range 510. The server computer can also store the second range 510 in association with the second data item 512.

At step 314, the server computer can perform additional processing. In some embodiments, additional processing can include performing the methods of FIGS. 5-8. For example, additional processing can include, after storing the hashed plurality of values, the server computer receiving a request message comprising at least a credential from a client device. The server computer can then form an altered value from the credential using a hash function and then determine whether or not the altered value matches one of the hashed values stored in the database. The server computer can then determine a range of a plurality of ranges as well as an associated data item associated with the matched hashed value. The server computer can then provide the associated plan to the client device, for example, in a response message.

As an illustrative example, when the server computer searches if a PAN is in a range, the server computer can create a HMAC SHA256 hash of the given PAN and search against the various hashes that were previously created, as described above. If there is a match, then the server computer can determine that the given PAN matches an installment plan corresponding to the range match. This can help with rapidly searching the database, as the server computer is searching against the indexes.

The first altered data embodiment provides for a number of advantages as compared to conventional systems and methods that might be used to locate data items associated with credentials. For example, according to conventional methods, for example, a computer can receive a credential such as a PAN and search a database for a data item stored with the PAN. The PAN can be stored in the database with, for example, a data item including a plan identification number. The computer can compare a received PAN to each stored PAN in order to determine whether or not the received PAN is associated with a data item.

Embodiments provide for a number of advantages over prior methods, for example, the first altered data embodiment provides for a method to store hashed credentials as well as associated hashed ranges in a database, thus improving security of the credentials stored in the database. Plaintext PANs and plaintext ranges do not need to be stored in the database in order to determine if a particular PAN is within a particular range. Further, the ranges are hashed such that a malicious party cannot readily determine whether or not a compromised credential is included within a particular range. The first altered data embodiment provides for a search through the database to determine a hashed range associated with a stored hashed value that is found to match the hashed credential. The received credential cannot simply be compared to the hashed range, since the hashed range values may appear to be random compared to the range values. To see if the credential falls within the hashed range, the server computer can compare the received and hashed credential to stored hashed values associated with the hashed range in the database, in order to determine whether or not a hashed credential falls within a hashed range.

B. Database Initialization—Second Altered Data Embodiment

Figure 4:
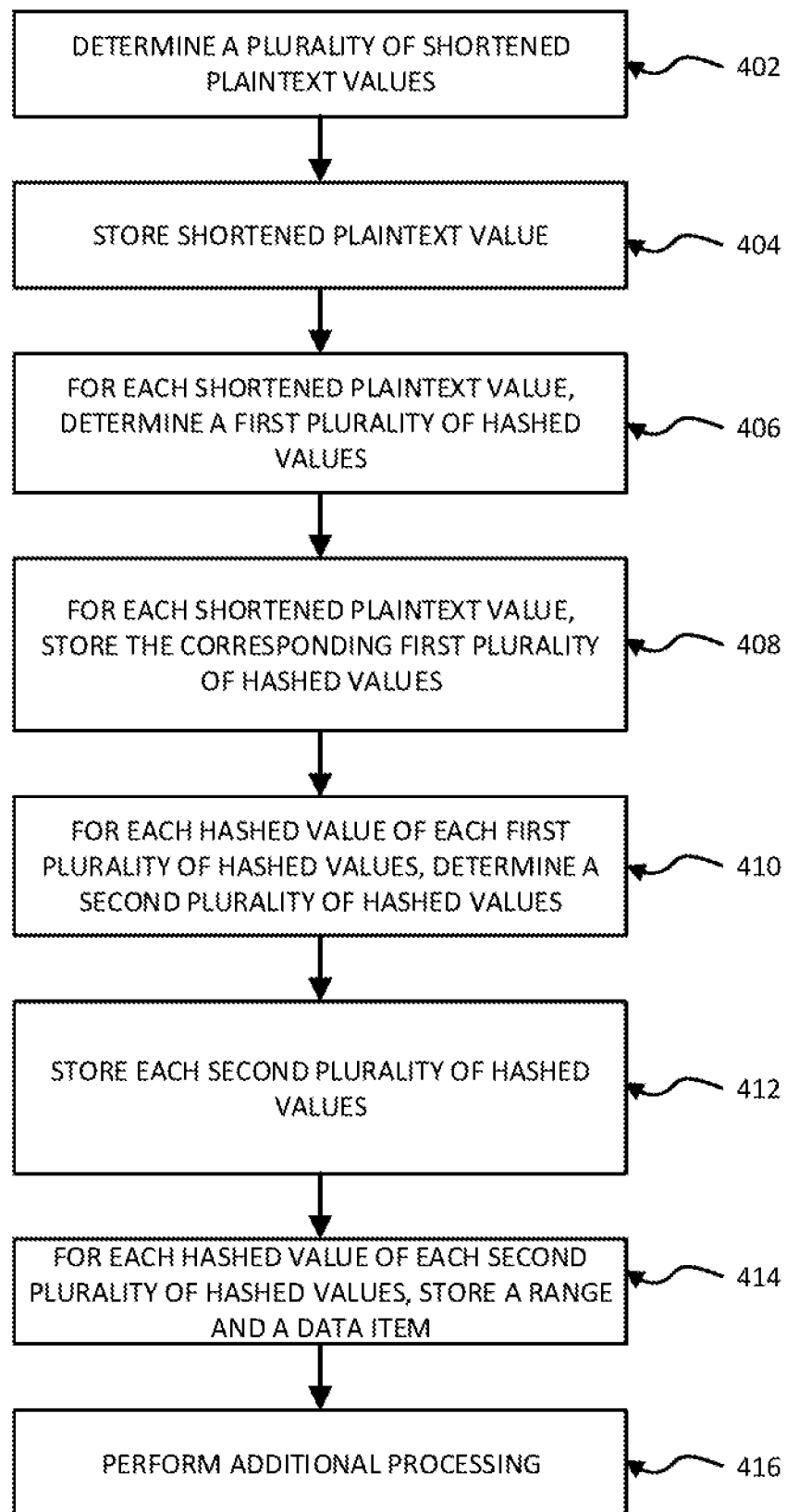
FIG. 4 shows a flow diagram of an alternate rapid searchable altered data creation method according to embodiments.

FIG. 4 shows a flow diagram of an alternate rapid searchable altered data creation method according to embodiments. The method illustrated in FIG. 4 will be described in the context of a server computer initializing a database according to a second altered data embodiment. It is understood, however, that the invention can be applied to other circumstances. Further, FIG. 5 shows illustrative databases according to embodiments. A second database 520 of FIG. 5 illustrates a database initialized with the method of FIG. 4.

The second database 520 can comprise a plurality of shortened plaintext values. For example, the second database 520 can include a first shortened plaintext value 521 and a second shortened plaintext value 531. Referring to FIG. 4, a sever computer can initialize the second database 520. At step 402, the server computer can determine each variation of a first predetermined number of digits. For example, the first predetermined number of digits may be 9 digits. The server computer can determine the values of 000000000-999999999. The credentials, for example, may be 16 digits. The determined 9 digit values can be shortened plaintext credentials. The shortened plaintext values can be representative of plaintext values (that may correspond to credentials), but have been shortened to a first predetermined number of digits (e.g., 5 digits, 9 digits, 14 digits, etc.). The shortened plaintext values (521 and 531) of the second database 520 can be values corresponding to credentials shortened to 9 digits. In some embodiments, there may be any suitable number of shortened plaintext values stored in the database. For example, in some embodiments, each possible variation of the 9 digits can be stored in the database (e.g., each value from 000000000 to 999999999).

At step 404, the server computer can store each variation of the first predetermined number of digits. For example, the server computer can store the first shortened plaintext value 521 of 123456789 and the second shortened plaintext value of 531 in a database.

At step 406, for each shortened plaintext value, the server computer can determine a first plurality of hashed values. Then, at step 408, for each shortened plaintext value, the server computer can store the first plurality of hashed values. The first plurality of hashed values being stored in association with the respective shortened plaintext value.

As an illustration of steps 406 and 408, each shortened plaintext value can be stored in the second database 520 in association with a first plurality of hashed values. The first plurality of hashed values that is associated with the first shortened plaintext value 521 can comprise the hashed values of LAPGNF 522, NGHPQG 523, and QBVCXZ 524. The server computer can determine the first plurality of hashed values associated with the first shortened plaintext value 521 by hashing each variation of the value of the shortened plaintext values plus one (or other number) of additional digits. For example, the first shortened plaintext value 521 can be a value of 123456789 (e.g., a first 9 digits of a credential). The hashed values of the associated first plurality of hashed values can include the hashed values of LAPGNF 522, NGHPQG 523, and QBVCXZ 524, which respectively can be formed from the values of 1234567890, 1234567891, and 1234567892. In this example, there may be up to ten hashed values of the first plurality of hashed values since there may be ten variations of 123456789X, where X is varied from 0-9. The second database 520 shows the hashed values of the first plurality of hashed values as including both the plaintext value and the corresponding hashed value for illustrative purposes. It is understood, that in some embodiments, the only plaintext values stored in the second database 520 may include the plurality of shortened plaintext values (e.g., the first shortened plaintext value 521 and a second shortened plaintext value 531).

At step 410, for each hashed value of the first plurality of hashed values, the server computer can determine a second plurality of hashed values. Then at step 412, the server computer can store the second plurality of hashed values for each first plurality of hashed values for each shortened plaintext value.

For example, each hashed value of each first plurality of hashed values can be associated with a second plurality of hashed values. For example, the hashed value of LAPGNF 522 (e.g., corresponding to the plaintext value of 1234567890) can be associated with the second plurality of hashed values including the hashed values of GNREUI 525, NMHOPQ 526, and BNJSLA 527. The second plurality of hashed values can be formed, by the server computer, by hashing each variation of the corresponding plaintext value of the hashed value of the first plurality of hashed values plus one (or other number) of additional digits. For example, the hashed value of LAPGNF 522 can correspond to the plaintext value of 1234567890 (e.g., a first 10 digits of a credential). The hashed values of the associated second plurality of hashed values can include the hashed values of GNREUI 525, NMHOPQ 526, and BNJSLA 527, which respectively correspond to values of 12345678900, 12345678901, and 12345678901. In this example, there may be up to ten hashed values of the first plurality of hashed values since there may be ten variations of 1234567890Y, where Y is varied from 0-9. The second database 520 shows the hashed values of the second plurality of hashed values as including both the plaintext value and the corresponding hashed value for illustrative purposes.

At step 414, the server computer can store a range in association with each hashed value of each second plurality of hashed values. Further, the server computer can store a data item in association with each stored range.

Each hashed value of each second plurality of hashed values (525, 526, and 527) can be associated with a range. For example, the hashed value GNREUI 525 can be associated with the first range 528. The first range 528 can for example, be a range which includes each possible value (e.g., credential) which shares the same first 11 digits with the value (e.g., 12345678900) used to form the hashed value GNREUI 525. For example, the first range 528 may be a range of 1234567890000000-1234567899999999. In some embodiments, however, the first range 528 can be a first hashed range. For example, the first range 528 may include a hashed lower limit and a hashed upper limit. For example, the lower limit of 1234567890000000 can be hashed to KAHFOW while the upper limit of 1234567899999999 can be hashed to LKQUYU. The first range 528, as stored in the second database 520, can be KAHFOW-LKQUYU.

In some embodiments, each range of a plurality of ranges stored in the second database 520 can be stored in association with a data item. For example, the first range 528 can be stored in association with the first data item 529. The first data item 529 can include any suitable data item described herein.

At step 416, the server computer can perform additional processing. In some embodiments, additional processing can include performing the methods of FIGS. 5-8, as described in further detail herein.

The second altered data embodiment provides for a number of advantages. As noted above, in prior methods, a computer can receive a credential such as a PAN and search a database for a data item stored with the PAN. The PAN can be stored in the database with, for example, a data item including a plan identification number. The computer can compare a received PAN to each stored PAN in order to determine whether or not the received PAN is associated with a data item.

Embodiments provide for a number of advantages over prior methods, for example, the second altered data embodiment provides for, at least, 1) efficient database initialization, 2) the protection of data from malicious parties, and 3) a database architecture that is rapidly searched.

For example, in the second altered data embodiment, during database initiation, a server computer may not need to compute a hashed value for each potential credential and store all of the hashed values in a database. Rather, the server computer can compute the first plurality of hashed values (e.g., including 522, 523, and 524) of FIG. 5 for each shortened plaintext value (e.g., including 521 and 531) and the corresponding second plurality of hashed values (e.g., including 525, 526, and 527), thus reducing the total number of hashed values that need to be computed and stored. The server computer can store fewer hashed values in the second altered data embodiment, thus saving database storage space.

Additionally, in the second altered data embodiment, the server computer can rapidly search the database for a hashed range that is associated with a received credential. For example, the server computer can truncate the credential and compare the truncated credential to the plurality of shortened plaintext values (e.g., 521 and 531). By doing so, the server computer can eliminate a large number of potential matches. For example, by first matching a truncated credential to the shortened plaintext value 531 of 987654321, the server computer has eliminated the possibility that the credential is associated with any of the hashed values (e.g., 522, 523, 524, 525, 526, and 527), and eventually hashed ranges (e.g., 528), relating to the shortened plaintext value 521. Embodiments provide for a search method that is faster than the conventional method of searching through every possible PAN stored in a database.

C. Database Initialization—Third Altered Data Embodiment

A third database 550 of FIG. 5 illustrates a database initialized with a third altered data embodiment. The third database 550 may be initialized by a server computer based on a combination of steps from FIG. 3 and from FIG. 4.

The third database 550 can comprise a plurality of shortened plaintext values. For example, the second database 520 can include a first shortened plaintext value 552 as well as additional shortened plaintext values (not shown). The plurality of shortened plaintext values (552) of the third database 550 may be similar to the plurality of shortened plaintext values (521 and 531) of the second database 520. The first shortened plaintext value 552 can be representative of a plaintext value (that may correspond to a credential), but has been shortened to a first predetermined number of digits (e.g., 9 digits). As depicted in FIG. 5, the first shortened plaintext value 552 can be a value of 123456789. In some embodiments, there may be any suitable number of shortened plaintext values stored in the database. For example, in some embodiments, each possible variation of the 9 digits can be stored in the third database 550 (e.g., each value from 000000000 to 999999999).

Each shortened plaintext value can be associated with a hashed expanded range. For example, the first shortened plaintext value 552 can be associated with the first plurality of hashed values 554. Whereas, a second shortened plaintext value may be associated with a second hashed expanded range. The first plurality of hashed values 554 can be similar to the first hashed expanded range 502 of the first database 500. For example, the first plurality of hashed values 554 can include hashed values corresponding to credentials which may begin with the same 9 digits of the first shortened plaintext value 552.

The first plurality of hashed values 554 can be associated with a first hashed range 556 that can be associated with a first data item 558. The first hashed range 556 can be associated with the first data item 558 as described herein.

At a later point in time, after initialization of the hybrid database, the server computer can receive a request message comprising a credential from a client device, for example, from a user device via a transport computer. The server computer can hash the receive credential to form an altered value. In some embodiments, the server computer can truncate the credential to a first predetermined number of digits (e.g., 4 digits, 8 digits, 9 digits, 13 digits, etc.). For example, the server computer can receive the credential of 1234567890000000, and then truncate the credential to 9 digits, to form a truncated credential of 123456789.

After determining the truncated credential, the server computer can compare the truncated credential to the stored shortened plaintext values in the database iteratively. For example, the server computer can compare the truncated credential of 123456789 to the first shortened plaintext value 552 of 123456789.

If the truncated credential and a shortened plaintext value match, then the server computer can hash the credential to form an altered value. For example, the server computer can hash the credential of 1234567890000000 to obtain an altered value of KSNGOP.

After determining the altered value, the server computer can determine whether or not the altered value matches one of the hashed values stored in the database. In particular, the server computer can determine whether or not the altered value matches one of the hashed values of the first plurality of hashed values 554, since the server computer determined that the truncated credential matches the first shortened plaintext value 552. In other embodiments, if the server computer determined that the truncated credential matches an Nth shortened plaintext value, then the server computer can determine whether or not the altered value matches one of the hashed values of the Nth plurality of hashed values.

If the altered value matches a matched hashed value, then the server computer can determine a range of a plurality of ranges, the range being associated with the matched hashed value. For example, the server computer can determine that the first plurality of hashed values 554 includes a hashed value which matches the altered value. The server computer can determine the associated range to be the first hashed range 556. After determining the first hashed range 556, the server computer can determine a data item that is associated with the range. In this example, the server computer can determine that the first hashed range 556 is associated with the first data item 558.

The server computer can perform any suitable processing related to processing the data item and/or an interaction. In some embodiments, the server computer can generate a response message based on the request message received from the client device. The response message comprising the data item.

For example, in some embodiments, the server computer can include the determined data item (e.g., the first data item 558) into an authorization request message and provide the authorization request message to an authorizing entity computer. The authorizing entity computer can, for example, determine whether or not to authorize the interaction between a user of a user device and a resource provider of a resource provider computer based on the authorization request message. In some embodiments, the authorizing entity computer can generate an authorization response message comprising an indication of whether or not the interaction is authorized as well as the data item. The authorizing entity computer can provide the authorization response message to the server computer. After receiving the authorization response message, the server computer can provide the data item to the client device. For example, the server computer can provide the authorization response message to the transport computer, which may provide the authorization response message, for example, to the user device via a resource provider computer.

The third altered data embodiment can provide for a number of advantages over conventional systems that may compare a received credential such as a PAN to each and every PAN stored in a database to determine an associated data item such as a plan number. For example, embodiments provide a way to securely store data so that it is not susceptible to a data breach. Further, during an interaction, a server computer can eliminate potentially associated hashed ranges quickly when determining whether or not the hashed range is associated with a credential. For example, the server computer can determine between a plurality of shortened plaintext values, and thus may not need to compare the hashed credential to each stored hashed credential, but can compare the hashed credential to the hashed values of only a first plurality of hashed values (e.g., 554) to ultimately identify the desired data item. The server computer does not need to search through a second plurality of hashed values associated with a second shortened plaintext value, thus reducing the number of hashed values which need to be searched. Rather than searching through approximately 9,999,999,999,999,999 hashed values (e.g., if 16 digit credentials are utilized and none are removed), the server computer can search through approximately 999,999,999 shortened plaintext values (e.g., if 9 digit shortened plaintext values are utilized and none are removed). The server computer can then search through approximately 9,999,999 hashed values of the plurality of hashed values (e.g., 554) associated with the matched shortened plaintext value (e.g., if none of the hashed values are removed). Embodiments provide for a secure and rapid search for a hashed range associated with hashed credentials in a database.

D. Interaction Processing and Altered Data Search

Figure 6:
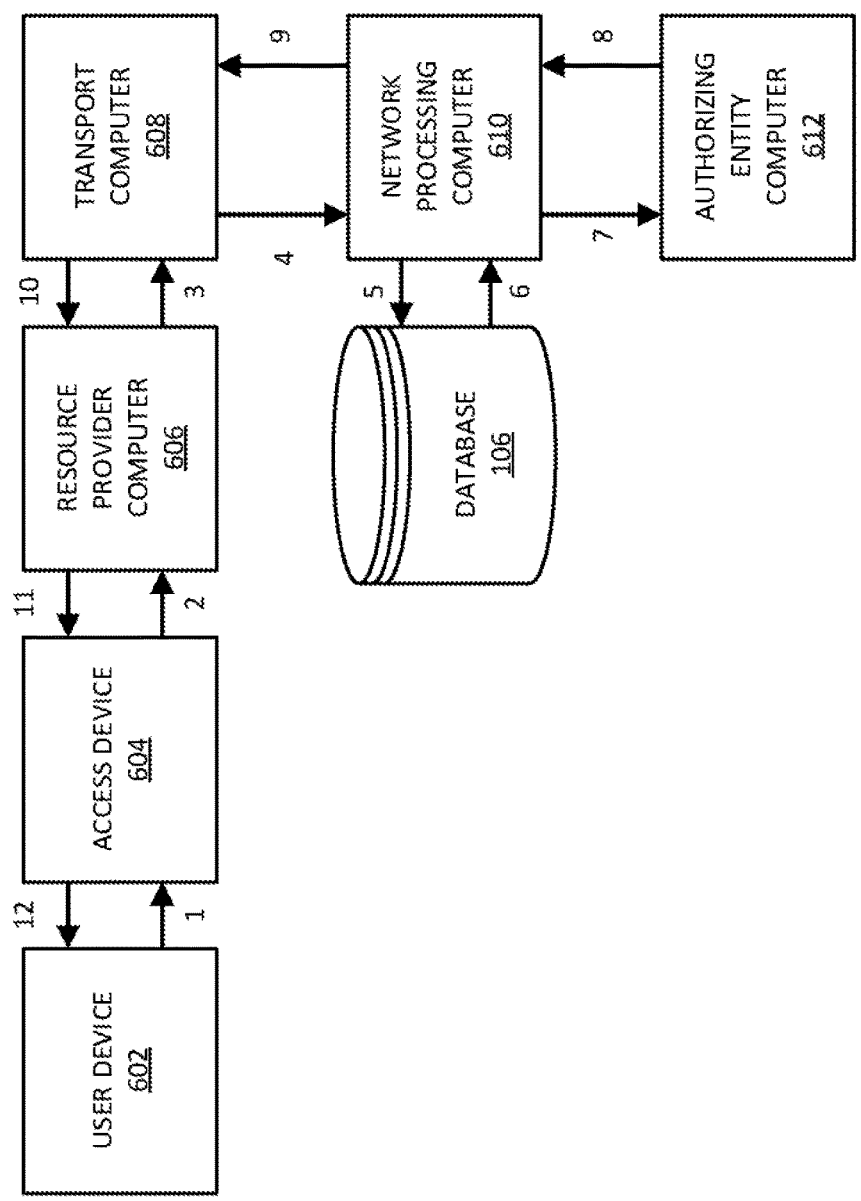
FIG. 6 shows a flow diagram of an interaction processing method according to embodiments.

FIG. 6 shows a flow diagram of an interaction processing method according to embodiments. The method illustrated in FIG. 6 will be described in the context of a server computer being a network processing computer. The network processing computer may facilitate in determining a data item for an interaction based on a received credential. It is understood, however, that the invention can be applied to other circumstances (e.g., the network processing computer determining a data item based on a received access code from a user device, the user of the user device requesting access to a secure building, etc.).

A user may conduct an interaction with a resource provider, which operates a resource provider computer 606, using a user device 602 at an access device 604. The interaction may be a payment transaction (e.g., for the purchase of a good or service), an access transaction (e.g., for access to a transit system), or any other suitable interaction. The user device 602 can interact with the access device 604 at a resource provider location associated with resource provider computer 606. For example, at step 1, the user may tap user device 602 against an NFC reader in the access device 604. Alternately, the user may indicate interaction data to the resource provider computer 606 electronically, such as in an online interaction. In some embodiments, the user device 602 may transmit a credential to the access device 604. The credential can include, as an illustration, a primary account number, an expiration date, a verification value, etc.

At step 2, the access device 604 can provide the data received from the user device 602 to the resource provider computer 606. For example, in some embodiments, the access device 604 can provide interaction data and/or a credential to the resource provider computer 606.

At step 3, after receiving at least the credential from the access device 604, the resource provider computer 606 can generate an authorization request message comprising the credential. The authorization request message, in some embodiments, can further comprise the interaction data. After generating the authorization request message, the resource provider computer 606 can transmit the authorization request message to the transport computer 608.

At step 4, after receiving the authorization request message, the transport computer 608 can provide the authorization request message to the network processing computer 610.

At step 5, after receiving the authorization request message, the network processing computer 610 can determine whether or not the credential is associated with a data item of a plurality of data items stored in the database. The network processing computer 610 can perform any suitable altered data search method described herein. For example, the network processing computer 610 can hash the received credential to form an altered value. The network processing computer 610 can then determine whether or not the altered value matches one of the hashed values stored in the database. As an illustrative example, the network processing computer 610 can receive a credential of 1234567890123456. The network processing computer 610 can input the credential into a hash function. The output of the hash function can be the altered value of LAKYTP (e.g., LAKYTP=Hash (1234567890123456). The network processing computer 610 can determine that the altered value of LAKYTP matches a stored hashed value of LAKYTP stored in the database.

In some embodiments, if the database was initialized using the first altered data embodiment, as described in FIG. 3, then the network processing computer 610 can compare the altered value of LAKYTP to each stored hashed value. For example, the network processing computer 610 can compare the altered value to each stored hashed value in sequence until a match is determined, if a match exists. The network processing computer 610 can compare the altered value to each stored hashed value of, for example as depicted in FIG. 5, the first hashed expanded range 502, the second hashed expanded range 508, and any other stored hashed expanded ranges. In this example, the network processing computer 610 can determine that the altered value of LAKYTP matches a stored hashed value of LAKYTP.

In other embodiments, if the database was initialized using the second altered data embodiment, as described in FIG. 4, then the network processing computer 610 can truncate the credential to a first predetermined number of digits (e.g., 4 digits, 8 digits, 9 digits, 13 digits, etc.). For example, the network processing computer 610 can truncate the credential of 1234567890123456 to 9 digits, to form a first truncated credential of 123456789. After determining the first truncated credential, the network processing computer 610 can compare the first truncated credential to a plurality of shortened plaintext values stored in the database (e.g., the first shortened plaintext value 521 and the second shortened plaintext value 531 of the second database 520). For example, the network processing computer 610 can compare the first truncated credential of 123456789 to the first shortened plaintext value 521 of 123456789, and the second shortened plaintext value 531 of 987654321. The network processing computer 610 can, for example, determine that the first truncated credential matches the first shortened plaintext value 521.

If the first truncated credential matches a matched shortened plaintext value of the plurality of shortened plaintext values, the step of hashing the credential to form the altered value can further including truncating the credential to a second predetermined number of digits (e.g., 1 digit longer than the first predetermined number of digits) to form a second truncated credential and then hashing the second truncated credential to form the altered value. For example, if the first truncated credential and a shortened plaintext value match, then the network processing computer 610 can compare the altered value to a first plurality of hashed values associated with the first truncated credential.

As an example, the network processing computer 610 can determine the second truncated credential that is 1 digit longer than the predetermined number of digits. For example, the network processing computer 610 can determine the second truncated credential by truncating the credential to 10 digits, forming the second truncated credential of 1234567890. The second truncated credential can be hashed to be an altered value of LAPGNF. The network processing computer 610 can compare the altered value of LAPGNF to the first plurality of hashed values (e.g., 522, 523, and 524) of FIG. 5, which are associated with the first shortened plaintext value 521 of 123456789.

After matching the altered value to a stored hashed value of the first plurality of hashed values, the network processing computer 610 can repeat the above process to create a third truncated credential, hash the third truncated credential, and compare the third truncated credential to stored hashed values of a second plurality of stored hashed values (e.g., 525, 526, and 527 of FIG. 5).

For example, if the altered value above, such as a first altered value, matches one hashed value of the first plurality of hashed values, then the network processing computer 610 can truncate the credential (e.g., 1234567890123456) to a third predetermined number of digits to form a third truncated credential. The third truncated credential can be 1 digit longer than the second truncated credential. For example, the third truncated credential may be 12345678901. The network processing computer 610 can hash the third truncated credential to form a second altered value, for example, NMHOPQ. The network processing computer 610 can determine whether or not the second altered value derived from the third truncated credential matches a stored hashed value 526 of FIG. 5. In other words, the network processing computer 610 can compare the second altered value to the second plurality of hashed values stored in the database in association with the one hashed value (matched to the altered value). If a match is determined, then the network processing computer 610 can proceed to determining the range, described in further detail below.

In yet other embodiments, if the database was initialized using a third altered data embodiment between the first altered data embodiment and the second altered data embodiment, then the network processing computer 610 can truncate the credential to a first predetermined number of digits (e.g., 4 digits, 8 digits, 9 digits, 13 digits, etc.). For example, the network processing computer 610 can receive the credential of 1234567890123456, and then truncate the credential to 9 digits, to form a truncated credential of 123456789.

After determining the truncated credential, the network processing computer 610 can compare the truncated credential to the stored shortened plaintext values in the database iteratively. For example, the network processing computer 610 can compare the truncated credential of 123456789 to the first shortened plaintext value 552 of 123456789. These steps of truncating the credential and comparing the truncated credential to a stored shortened plaintext value can be from the second altered data embodiment, whereas the following steps of the third altered data embodiment may be from the first altered data embodiment, however, it is understood that other variations of the third altered data embodiment can be utilized.

If the truncated credential and a shortened plaintext value match, then the network processing computer 610 can hash the credential to form an altered value. For example, the network processing computer 610 can hash the credential of 1234567890123456 to obtain an altered value of LAKYTP. After determining the altered value, the network processing computer 610 can determine whether or not the altered value matches one of the hashed values stored in the database. In particular, the network processing computer 610 can determine whether or not the altered value of LAKYTP matches one of the hashed values of the first plurality of hashed values 554, since the network processing computer 610 determined that the truncated credential matches the first shortened plaintext value 552. This can be because the first shortened plaintext value 552 and the first plurality of hashed values 554 are indexed to one another in the database.

After determining that the altered value matches a stored hashed value, in the first altered data embodiment, the second altered data embodiment, and the third altered data embodiment, then the network processing computer 610 can determine a range of a plurality of ranges, the range being associated with the matched hashed value. For example, during initialization of the database, the network processing computer 610 can store the range, which may be hashed in some embodiments, in association with the stored hashed values. Thus, when the network processing computer 610 determines that a received credential when altered into the altered value matches a stored hashed value, the network processing computer 610 can determine the stored range by following an index between the matched value and the range.

After determining the range, the network processing computer 610 can determine a data item associated with the range. For example, the data item can be indexed to the range. The network processing computer 610 can determine which data item of a plurality of data items is stored in association with the range. After determining the data item, at step 6, the network processing computer 610 can retrieve the data item from the database 106.

In some embodiments, after determining the data item, the network processing computer 610 can determine whether or not the data item is applicable based on any suitable criteria. For example, the network processing computer 610 can receive interaction data in the authorization request message from the transport computer 608. The network processing computer 610 can determine if interaction data satisfies the criteria of the data item. For example, the data item can be a first installment plan which may offer a payment plan of 3 payments over 3 months when the amount of the interaction (e.g., a transaction) is over $500. The network processing computer 610 can determine, for example, that the interaction data includes an amount of $550, which is greater than the minimum amount of $500 (e.g., the criteria) of the first installment plan. The network processing computer 610 can then proceed with the data item in the current interaction.

In other embodiments, more than one data item may be associated with a hashed range stored in the database. For example, the first range can be associated with three different data items in the database. The three different data items can include, for example, a first installment plan of 2 payments over 4 months when the amount of the transaction is over $600, a second installment plan of 6 payments over 6 months when the amount of the transaction is over $5000 and has a SKU relating to "electronics," and a third installment plan of 4 payments over 4 weeks when the transaction takes place in California. The three different installment plans are described as illustrative data items, it is understood that the data items can include any suitable data item described herein.

It is understood that the data item can include any suitable data item described herein. For example, a data item can include data identifying a particular encryption process, data identifying a routing table that can determine to which computers a request message can be forwarded based on received value (e.g., a credential) associated with the data item, or data identifying a communication channel on which subsequent communications may occur.

For example, in some embodiments, the server computer can receive a request message comprising a value (e.g., an IP address, a unique device identifier, a password, etc.) from a client device. After determining a range of the plurality of ranges, where the range is determined based on the received value, described above, the server computer can determine a data item associated with the range. The data item can include, for example, data identifying a routing table. For example, the received value can be an IP address of an IP address (or other identifying data) of a destination device, which can be a destination for the request message. The server computer can determine the routing table based on the associated range. In some embodiments, the server computer can then utilize the routing table to route the request message and/or other suitable data to the destination device. In other embodiments, the server computer can provide the routing table to the client device. The client device may then transmit data to and from the destination device utilizing the routing table.

In other embodiments, the data item can be an encryption process of a plurality of encryption processes. For example, the server computer can determine a data item based on a received credential from the client device. The server computer can encrypt the credential and/or other data in the request message based on the encryption process.

In some embodiments, after determining the data item, the network processing computer 610 can provide the data item to the client device in any suitable manner. For example, in some embodiments, the network processing computer 610 can provide the data item directly to the client device in a response message. In other embodiments, the network processing computer 610 can provide the data item to an authorizing entity computer 612. Then, upon receiving a response from the authorizing entity computer 612, the network processing computer 610 can provide the data item to the transport computer 608. This embodiment is further described in steps 7-12.

At step 7, the network processing computer 610 then transmits the authorization request message to the authorizing entity computer 612 associated with an authorizing entity associated with the user's account. In some embodiments, the network processing computer 610 can include the determined data item in the authorization request message. For example, the network processing computer 610 can modify the authorization request message to include the data item. For example, modifying the authorization request message can include inserting the data item into a new or existing data field of the authorization request message.

After receiving the authorization request message, the authorizing entity computer 612 can determine whether or not to authorize the interaction. The authorizing entity computer 612 can generate an indication of whether or not the interaction is authorized.

At step 8, the authorizing entity computer 612 can generate and transmit an authorization response message to the network processing computer 610. The authorization response message can comprise the indication of whether or not the interaction is authorized. In some embodiments, the authorization response message can further comprise the data item and/or the credentials.

At step 9, after receiving the authorization response message from the authorizing entity computer 612, the network processing computer 610 can transmit the authorization response message to the transport computer 608. In some embodiments, the network processing computer 610 may decline the interaction even if the authorizing entity computer 612 has authorized the interaction, for example depending on a value of a fraud risk score, or other suitable reason.

At step 10, the transport computer 608 can then send the authorization response message back to the resource provider computer 606. At step 11, After the resource provider computer 606 receives the authorization response message, the resource provider computer 606 may then provide the authorization response message to the access device 604 or to the user directly. For example, the authorization response message may be displayed by the access device 604, or may be printed out on a physical receipt. Alternately, if the interaction is an online interaction, the resource provider computer 606 may provide a web page or other indication of the authorization response message as a virtual indication.

In addition to the advantages described above, embodiments of the invention have a number of additional advantages. A server computer can create rapid searchable altered data in a database. The server computer can be capable of expanding ranges of values and removing values that do not satisfy a predetermined criteria. In this way, there can be fewer values to later search through when determining whether or not a particular value is included in a hashed range. The server computer can also hash (i.e., alter) the values and store the hashed values in a database and index the hashed values to the range, which can also be hashed. By hashing both the ranges and the values (e.g., credentials) the server computer decreases the possibility of a malicious party obtaining the values and/or the ranges. In this way, the server computer may not need to store plaintext credentials in order to compare them to plaintext ranges or a plaintext plan value.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a server computer, a request message comprising at least a credential from a client device;
   hashing, by the server computer, the credential to form an altered value;
   determining, by the server computer, whether or not the altered value matches one of a number of hashed values stored in a database;
   if the altered value matches a matched hashed value, determining, by the server computer, a range of a plurality of ranges, the range being associated with the matched hashed value; and
   determining, by the server computer, a data item associated with the range, and wherein the method further comprises:
   prior to receiving the request message, generating, by the server computer, the plurality of ranges, each range including a lower limit and an upper limit
   for each range of the plurality of ranges, expanding, by the server computer, the lower limit and the upper limit of the range into a plurality of values;
   for each range of the plurality of ranges, removing, by the server computer, one or more values of the plurality of values based on a predetermined criteria;
   for each range of the plurality of ranges, hashing, by the server computer, the plurality of values that were not removed to form a plurality of hashed values; and
   for each range of the plurality of ranges, storing, by the server computer, the hashed plurality of values in the database, wherein each hashed value is indexed to each range, respectively.

2. The method of claim 1 further comprising:
   providing, by the server computer, the data item to the client device.

3. The method of claim 1, wherein the predetermined criteria includes the values passing a modulus 10 test.

4. The method of claim 1, wherein determining whether or not the altered value matches one of the hashed values stored in the database further comprises:
   comparing, by the server computer, the altered value to each hashed value of the plurality of hashed values.

5. The method of claim 1, wherein the server computer is a network processing computer, wherein the client device is a transport computer, and wherein the transport computer provides the data item to a resource provider computer during an interaction between a resource provider of the resource provider computer and a user of a user device, the user device being in communication with the resource provider computer.

6. The method of claim 1, wherein the plurality of values comprises a plurality of account numbers.

7. The method of claim 1, wherein the data item comprises documentation associated with an installment plan.

8. A method comprising:
receiving, by a server computer, a request message comprising at least a credential from a client device;
hashing, by the server computer, the credential to form an altered value;
determining, by the server computer, whether or not the altered value matches one of a number of hashed values stored in a database;
if the altered value matches a matched hashed value, determining, by the server computer, a range of a plurality of ranges, the range being associated with the matched hashed value; and
determining, by the server computer, a data item associated with the range, and wherein the method further comprises:
prior to receiving the request message, determining, by the server computer, a plurality of shortened plaintext values;
storing, by the server computer, the plurality of shortened plaintext values in the database;
for each shortened plaintext value of the plurality of shortened plaintext values, determining, by the server computer, a first plurality of hashed values; and
for each shortened plaintext value of the plurality of shortened plaintext values, storing, by the server computer, the first plurality of hashed values in association with each shortened plaintext value of the plurality of shortened plaintext values, respectively, in the database.

9. The method of claim 8 further comprising:
after storing the plurality of shortened plaintext values, generating, by the server computer, a plurality of ranges, each range including a lower limit and an upper limit, wherein each range of the plurality of ranges is respectively associated with each shortened plaintext value of the plurality of shortened plaintext values;
for each range of the plurality of ranges, expanding, by the server computer, the lower limit and the upper limit of the range into a plurality of values;
for each range of the plurality of ranges, removing, by the server computer, one or more values of the plurality of values based on a predetermined criteria;
for each range of the plurality of ranges, hashing, by the server computer, the plurality of values that were not removed;
for each range of the plurality of ranges, storing, by the server computer, the hashed plurality of values in the database in association with the associated shortened plaintext value of the plurality of shortened plaintext values, wherein the hashed plurality of values is indexed to the range; and
for each range of the plurality of ranges, respectively storing, by the server computer, each data item of a plurality of data items, wherein the data item is associated with the range.

10. The method of claim 8 further comprising:
for each hashed value of the first plurality of hashed values for each shortened plaintext value, determining, by the server computer, a second plurality of hashed values;
for each hashed value of the first plurality of hashed values for each shortened plaintext value, storing, by the server computer, the second plurality of hashed values in association with the respective hashed value of the first plurality of hashed values
for each hashed value of the second plurality of hashed values, storing, by the server computer, the range in the database; and
for each range in the database, storing, by the server computer, a data item in the database.

11. The method of claim 10 further comprising:
truncating, by the server computer, the credential to a first predetermined number of digits to form a first truncated credential; and
comparing, by the server computer, the first truncated credential to the plurality of shortened plaintext values stored in the database,
wherein, if the first truncated credential matches a matched shortened plaintext value of the plurality of shortened plaintext values, hashing the credential to form the altered value further comprises:
truncating, by the server computer, the credential to a second predetermined number of digits to form a second truncated credential; and
hashing, by the server computer, the second truncated credential to form the altered value.

12. The method of claim 11, wherein the altered value is a first altered value, and wherein determining whether or not the first altered value matches one of a number of hashed values stored in the database further comprises:
comparing, by the server computer, the first altered value to the first plurality of hashed values associated with the matched shortened plaintext value of the plurality of shortened plaintext values;
if the first altered value matches one hashed value of the first plurality of hashed values, truncating, by the server computer, the credential to a third predetermined number of digits to form a third truncated credential;
hashing, by the server computer, the third truncated credential to form a second altered value; and
comparing, by the server computer, the second altered value to the second plurality of hashed values stored in the database in association with the one hashed value.

13. A server computer comprising:
a processor; and
a non-transitory computer-readable medium coupled to the processor, the computer-readable medium comprising code executable by the processor for implementing a method comprising:
receiving a request message comprising at least a credential from a client device;
hashing the credential to form an altered value;
determining whether or not the altered value matches one of a number of hashed values stored in a database;
if the altered value matches a matched hashed value, determining a range of a plurality of ranges, the range being associated with the matched hashed value; and
determining a data item associated with the range, and wherein the non-transitory computer-readable medium further comprises:
an altered value creation module;
a range determination module;
a data item determination module; and
a communication module.

14. A server computer comprising:
a processor; and a computer-readable medium coupled to the processor, the computer-readable medium comprising code executable by the processor for implementing a method comprising:
  receiving a request message comprising at least a credential from a client device:
  hashing the credential to form an altered value;
  determining whether or not the altered value matches one of a number of hashed values stored in a database;
  if the altered value matches a matched hashed value, determining a range of a plurality of ranges, the range being associated with the matched hashed value; and
determining a data item associated with the range,
wherein the server computer is a network processing computer, the request message is an authorization request message, and wherein the method further comprises:
modifying the authorization request message to include the data item;
providing the authorization request message to an authorizing entity computer, wherein the authorizing entity computer determines whether or not to authorize an interaction associated with the authorization request message, determines an indication of whether or not the interaction is authorized, and provides an authorization response message to the server computer, the authorization response message comprising the indication of whether or not the interaction is authorized and the data item; and
receiving the authorization response message from the authorizing entity computer.

15. The server computer of claim 14, wherein the method further comprises:
  providing the authorization response message comprising the data item and the indication of whether or not the interaction is authorized to the client device.

16. The server computer of claim 15, wherein the authorization response message further comprises the credential.

17. The server computer of claim 16, where the credential is a primary account number.

18. A server computer comprising:
a processor; and
a computer-readable medium coupled to the processor, the computer-readable medium comprising code executable by the processor for implementing a method comprising:
  receiving a request message comprising at least a credential from a client device:
  hashing the credential to form an altered value;
  determining whether or not the altered value matches one of a number of hashed values stored in a database;
  if the altered value matches a matched hashed value, determining a range of a plurality of ranges, the range being associated with the matched hashed value; and
determining a data item associated with the range,
wherein the method further comprises:
prior to receiving the request message, expanding a lower limit and an upper limit of the range into a plurality of values;
removing one or more values of the plurality of values based on a predetermined criteria;
hashing the plurality of values that were not removed;
storing the hashed plurality of values in the database, wherein each hashed value is indexed to the range; and
storing a plurality of data items respectively in association with the plurality of ranges.

19. A server computer comprising:
a processor; and
a computer-readable medium coupled to the processor, the computer-readable medium comprising code executable by the processor for implementing a method comprising:
  receiving a request message comprising at least a credential from a client device:
  hashing the credential to form an altered value;
  determining whether or not the altered value matches one of a number of hashed values stored in a database;
  if the altered value matches a matched hashed value, determining a range of a plurality of ranges, the range being associated with the matched hashed value; and
determining a data item associated with the range,
wherein the method further comprises:
prior to receiving the request message, determining a plurality of shortened plaintext values;
storing the plurality of shortened plaintext values in the database;
for each shortened plaintext value of the plurality of shortened plaintext values, determining a first plurality of hashed values; and
for each shortened plaintext value of the plurality of shortened plaintext values, storing the first plurality of hashed values in association with each shortened plaintext value of the plurality of shortened plaintext values, respectively, in the database.

* * * * *